United States Patent
Tsukagoshi (10) Patent No.: US 6,636,563 B2
(45) Date of Patent: Oct. 21, 2003

(54) DECODER AND DECODING METHOD FOR INFORMATION SIGNAL

(75) Inventor: Ikuo Tsukagoshi, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/242,117

(22) PCT Filed: Jun. 12, 1997

(86) PCT No.: PCT/JP98/02600

§ 371 (c)(1),
(2), (4) Date: Feb. 10, 1999

(87) PCT Pub. No.: WO98/57496

PCT Pub. Date: Dec. 17, 1998

(65) Prior Publication Data

US 2003/0095600 A1 May 22, 2003

(30) Foreign Application Priority Data

Jun. 12, 1997 (JP) .............................. 9-154655

(51) Int. Cl.⁷ ................................ H04B 1/66
(52) U.S. Cl. ................................ 375/240.12
(58) Field of Search ............................ 375/240, 240.27, 375/240.12; 348/370.1, 571, 584, 400.1, 478, 460, 715; 704/201; 709/231; 725/115, 32; 386/52, 68

(56) References Cited

U.S. PATENT DOCUMENTS

| | | | | |
|---|---|---|---|---|
| 5,317,399 A | | 5/1994 | Satake et al. ............... 348/571 |
| 5,517,250 A | * | 5/1996 | Hoogenboom et al. 375/240.27 |
| 5,586,264 A | * | 12/1996 | Belknap et al. .............. 725/115 |
| 5,594,507 A | | 1/1997 | Hoarty ....................... 348/584 |
| 5,621,464 A | | 4/1997 | Teo et al. ................. 348/390.1 |
| 5,742,728 A | * | 4/1998 | Yanagihara et al. ........... 386/68 |
| 5,805,821 A | * | 9/1998 | Saxena et al. .............. 709/231 |
| 5,812,976 A | * | 9/1998 | Ryan .......................... 704/201 |
| 5,859,660 A | * | 1/1999 | Perkins et al. ................. 725/32 |
| 5,867,219 A | * | 2/1999 | Kohiyama ............... 348/400.1 |
| 5,907,366 A | * | 5/1999 | Farmer et al. .............. 348/478 |
| 5,943,102 A | * | 8/1999 | Hoshi ........................ 348/715 |
| 5,974,219 A | * | 10/1999 | Fujita et al. .................. 386/52 |

FOREIGN PATENT DOCUMENTS

EP    0 566 092    10/1993
EP    0 668 700    8/1995

* cited by examiner

Primary Examiner—Chris Kelley
Assistant Examiner—Allen Wong
(74) Attorney, Agent, or Firm—Frommer Lawrence & Haug LLP; William S. Frommer (57) ABSTRACT

To output audio even if video is frozen and to synchronize video with audio immediately after a release from freeze, in an MPEG decoder or the like. Freeze of motion picture data and continue output of it are performed using an output buffer area in a memory. I- and P-pictures in a data stream of motion pictures to be inputted in a freeze are decoded using a first output buffer area and a second output buffer area. Besides, a data stream of audio is decoded while keeping a synchronous relation ship with motion pictures. Since the decoded I- and P-pictures are stored in the first output buffer area and the second output buffer area even in the freeze, the video data can be outputted synchronizing with the audio data immediately after a release from freeze.

16 Claims, 10 Drawing Sheets

DECODER AND DECODING METHOD FOR INFORMATION SIGNAL

FIELD OF THE ART

The present invention relates to a device for decoding video data and audio data and its method, and specifically relates to special reproduction techniques for video data.

BACKGROUND ART

A technique for encoding video signals and audio signals for television using an encoding technique such as an MPEG (moving picture experts group) or the like, and transmitting or recording/reproducing them, will be generalized.

The above MPEG is constructed so that decoding and displaying timings of a video signal and an audio signal are synchronized using time stamps added to them bit streams, in a decoder at a receiving side or a reproducing side. And if video is frozen in the decoder, audio is muted because the timings cannot be synchronized using the time stamps.

An application which outputs audio even if video is frozen is desired. However, it causes a problem that if audio is outputted in the state where video is frozen, it takes a time to synchronize video and audio when the freeze is next released.

DISCLOSURE OF INVENTION

Considering the above point, the present invention aims to output audio even if video is frozen in an MPEG decoder or the like. Furthermore, the present invention aims to output a motion picture by returning immediately after a release from freeze. Moreover, the present invention aims to synchronize video with audio immediately after a release from freeze.

To solve above problem, in an information signal decoding method of the present invention, plural areas to store decoded motion picture data are prepared. Freeze and continuous output of the motion picture data are performed using one of said plural areas. Intraframe predicted pictures and forward predicted pictures in a data stream of motion pictures to be inputted in said freeze are decoded using the other areas. A data stream of audio is decoded while keeping a synchronous relationship with motion pictures.

Furthermore, in the information signal decoding method according to the present invention, in said decoding using the other areas, channel switching is prepared by decoding the data stream of motion pictures of a channel different from the frozen motion picture, and either of the frozen motion picture or the motion picture of the different channel is selected to selectively switch a channel.

An information signal decoding device according to the present invention provides a first decoding means for decoding a data stream of motion pictures, a second decoding means for decoding a data stream of audio, a motion picture data storing means having plural areas to store the decoded motion picture data, and a control means for synchronizing the decoding of motion picture data and the decoding of audio data. In this device, freeze and continuous output of motion picture data are performed using one of said plural areas, and intraframe predicted pictures and forward predicted pictures in a data stream of motion pictures to be inputted in a freeze are decoded using the other areas. A data stream of audio is decoded while keeping a synchronous relationship with said motion pictures.

The information signal decoding device according to the present invention further comprises a switching means for switching said plural areas for output, and a selecting means for selecting an area to be switched by the above switching means, to selectively switch a channel.

Moreover, in the information signal decoding method according to the present invention, at the time of write-in or readout in one of said plural areas, intraframe predicted pictures and forward predicted pictures in a data stream of motion pictures are decoded using the other areas, and the decoded motion picture data is outputted to said single area as a reduced picture.

An information signal decoding device according to the present invention comprises a decoding means for decoding a data stream of motion pictures, a motion picture data storing means having plural areas to store decoded motion picture data, and a picture reducing means for generating reduced picture data from the decoded motion picture data. In this device, at the time of write-in or readout in one of said plural areas, intraframe predicted pictures and forward predicted pictures in a data stream of motion pictures are decoded using the other areas, and the decoded motion picture is outputted to said single area as a reduced picture.

According to the present invention, freeze and continuous output of motion picture data are performed using one of plural areas in a motion picture storing means, and intraframe predicted pictures and forward predicted pictures in a data stream of motion pictures to be inputted in a freeze are decoded using the other areas. Besides, a data stream of audio is decoded while keeping a synchronous relationship with motion pictures.

Furthermore, according to the present invention, at the time of write-in or readout in one of said plural areas, intraframe predicted pictures and forward predicted pictures in a data stream of motion pictures are decoded using the other areas, and the decoded motion picture data is outputted to said single area as a reduced picture.

Moreover, according to the present invention, the function of special effects such as strobe reproduction, channel scanning, etc., can be realized.

BEST MODE FOR CARRYING OUT THE INVENTION

Hereinafter, an embodiment of the present invention will be described in detail with reference to the accompanying drawings.

Figure 1:
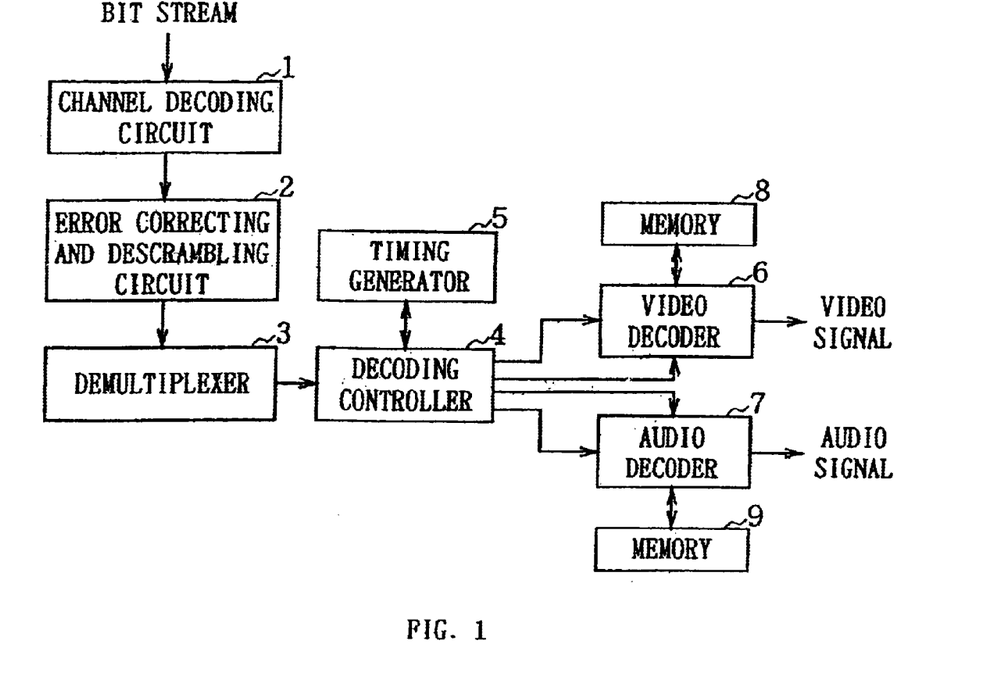
FIG. 1 is a block diagram showing the configuration of a data decoding device to which the present invention is applied.

FIG. 1 is a block diagram showing the configuration of a data decoding device to which the present invention is applied. Referring to FIG. 1, bit stream data is data reproduced from a recording medium such as a DVD or the like or data received from a digital broadcasting tuner or the like. A channel decoding circuit 1 performs channel decoding of the bit stream data. An error correcting and descrambling circuit 2 performs error correction and descrambling to output data from the channel decoding circuit 1. A demultiplexer 3 separates a bit stream of prescribed one or more channels from output data of the error correcting and descrambling circuit 2. A decoding controller 4 controls the decoding of a video decoder 6 and an audio decoder 7. A timing generator 5 generates a timing signal to be used by the decoding controller 4. The video decoder 6 decodes video data from the bit stream of video data utilizing a memory 8. The audio decoder 7 decodes audio data from the bit stream of audio data by means of memory 9.

Figure 2:
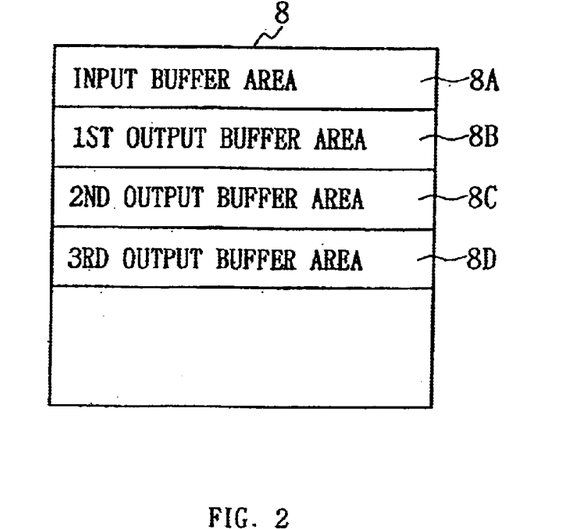
FIG. 2 is a diagram showing areas in a memory of FIG. 1.

FIG. 2 shows areas in the memory 8 of FIG. 1. In the memory 8, an input buffer area 8A and a first to a third output buffer areas 8B to 8D are provided. In the input buffer area 8A, video data to be outputted from the decoding controller 4 before decoding is stored. In the first to the third output buffer areas 8B to 8D, each decoded video data is stored respectively.

Figure 3:
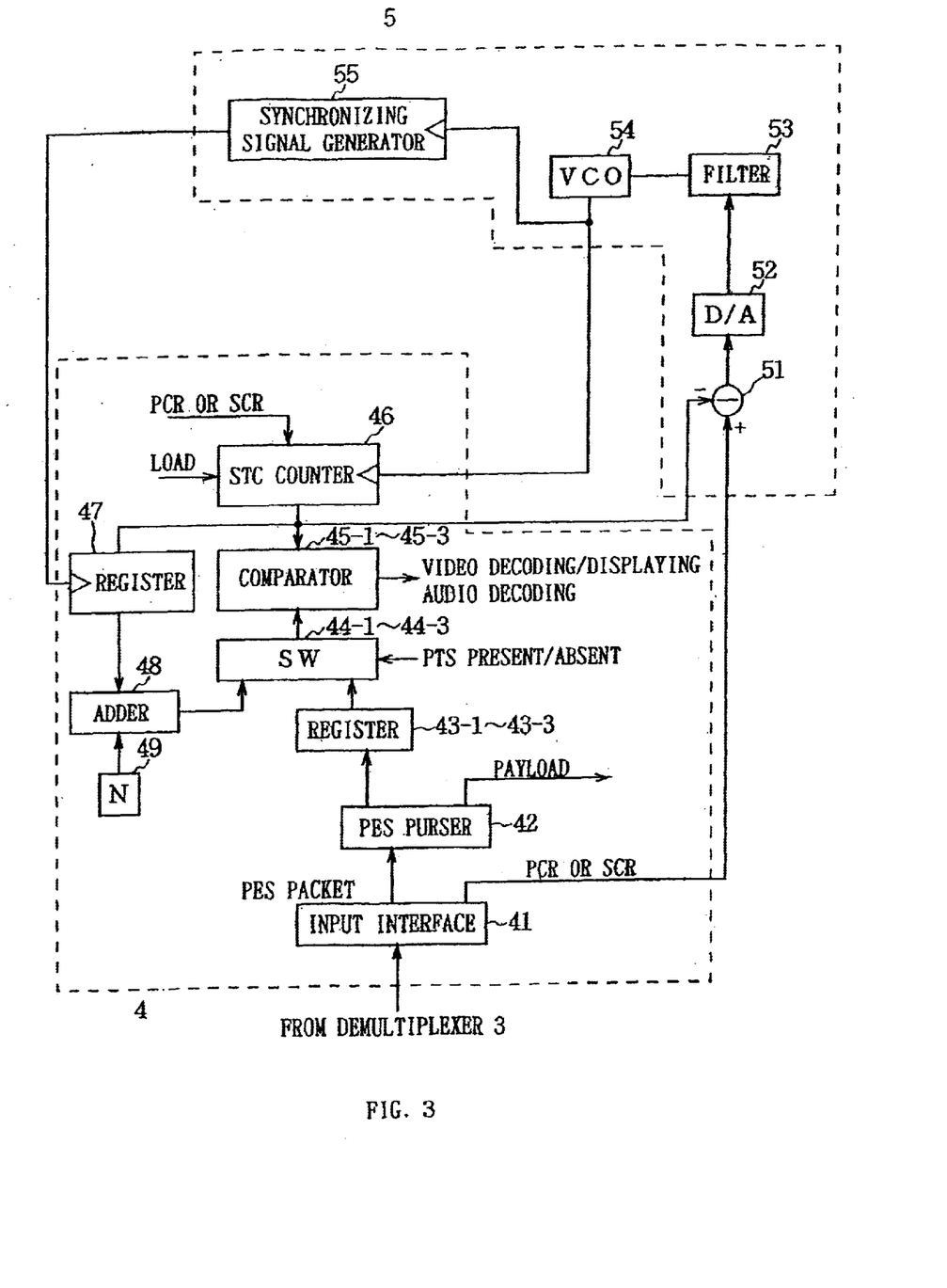
FIG. 3 is a block diagram showing the configurations of a decoding controller and a timing generator of FIG. 1.

FIG. 3 is a block diagram showing the configuration of the decoding controller 4 and the timing generator 5.

Referring to FIG. 3, a PES (packetized elementary stream) packet supplied from the demultiplexer 3 is transmitted to a PES purser 42 via an input interface 41. A PCR (program clock reference) or an SCR (system clock reference) is transmitted to an STC counter 46 and a differencer 51. The difference between the PCR value or the SCR value and the value of the STC counter 46 is obtained in the differencer 51. This difference value is converted into an analog signal by a D/A converter 52 to control a VCO (voltage control oscillator) 54 via a filter 53. An oscillation frequency of this VCO 54 is set to 29.97 Hz in an NTSC system, and 25 Hz in a PAL system. This output of the VCO 54 is set as the reference clock of the STC counter 46 in order to completely synchronize the operation of whole decoder with timing on a transmitting side. On the other hand, the PCR or the SCR code is loaded to the STC counter 46 at the moment when the PCR or the SCR reaches the decoding controller 4, presetting is completed at the time when the last byte of the PCR or the SCR is loaded into the STC counter 46, and count-up is started at the output clock of the VCO 54 from the next moment.

A PES packet supplied via the input interface 41 is separated into a PES header part and a payload part in the PES purser 42. Then, a DTS (decoding time stamp) and a PTS (presentation time stamp) are extracted from the PES header part. The DTS and the PTS of video data are stored in registers 43-1 and 43-2 respectively, and the PTS of audio data is stored in a register 43-3. And the video data and the audio data which are the payload parts are supplied to the video decoder 6 and the audio decoder 7 respectively. The DTS and the PTS stored in the registers 43-1 to 43-3 are individually compared with the value of the STC counter 46 in comparators 45-1 to 45-3, respectively. As a result, if the comparison result of the comparator 45-1 agrees or the difference is within a certain range, a command to start decoding the I-pictures or the P-pictures of the video data is outputted. If the comparison result of the comparator 45-2 agrees or the difference is within a certain range, a command to start displaying the I-pictures or the P-pictures of the video data or a command to start decoding B-pictures is outputted. If the comparison result of the comparator 45-3 agrees or the difference is within a certain range, a command to start decoding the audio data is outputted.

Since the DTS and the PTS do not always exist in each picture, they are needed to synchronize with the vertical synchronizing period of a video signal in the decoding controller 4 to perform decoding or displaying of the video data in a prescribed order according to the construction of a GOP (group of picture). Then, referring to FIG. 3, the value of the STC counter 46 is latched onto the register 47 at the timing of the vertical synchronizing signal outputted from a synchronizing signal generator 55. And the output of a register 49 in a unit of 90 KHz and having a value corresponding to one frame unit (3003 in the NTSC system, and 3600 in the PAL system) and the output of the register 47 are added by an adder 48 to complement the time stamps. When a flag in the PES header is referred, if the PTS exists in the bit stream, outputs of the registers 43-1 to 43-3 are used, while if there is no PTS in the bit stream, switches 44-1 to 44-3 are switched to use an output of the adder 48.

Figure 4:
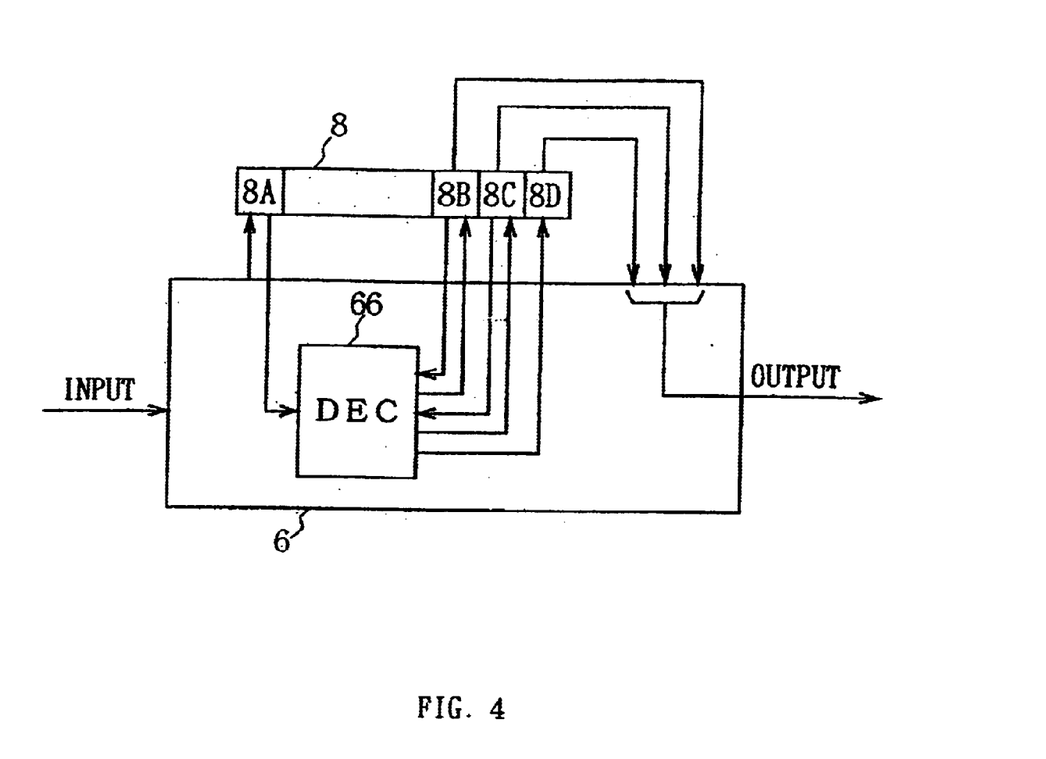
FIG. 4 is a diagram showing the flow of input/output video data in a video decoder in normal reproduction.

FIG. 4 shows the flow of input/output video data in the video decoder 6 in normal reproduction. The video data supplied from the demultiplexer 3 is stored in the input buffer area 8A in the memory 8. It is read out at the prescribed timing described with reference to FIG. 3 and decoded by a decoding part 66. Then, the decoded data is stored in one of the first to the third output buffer areas 8B to 8D in the memory 8 according to picture type. The stored data is read out from the output buffer area at the prescribed timing and outputted to the outside of the video decoder 6.

Figure 5:
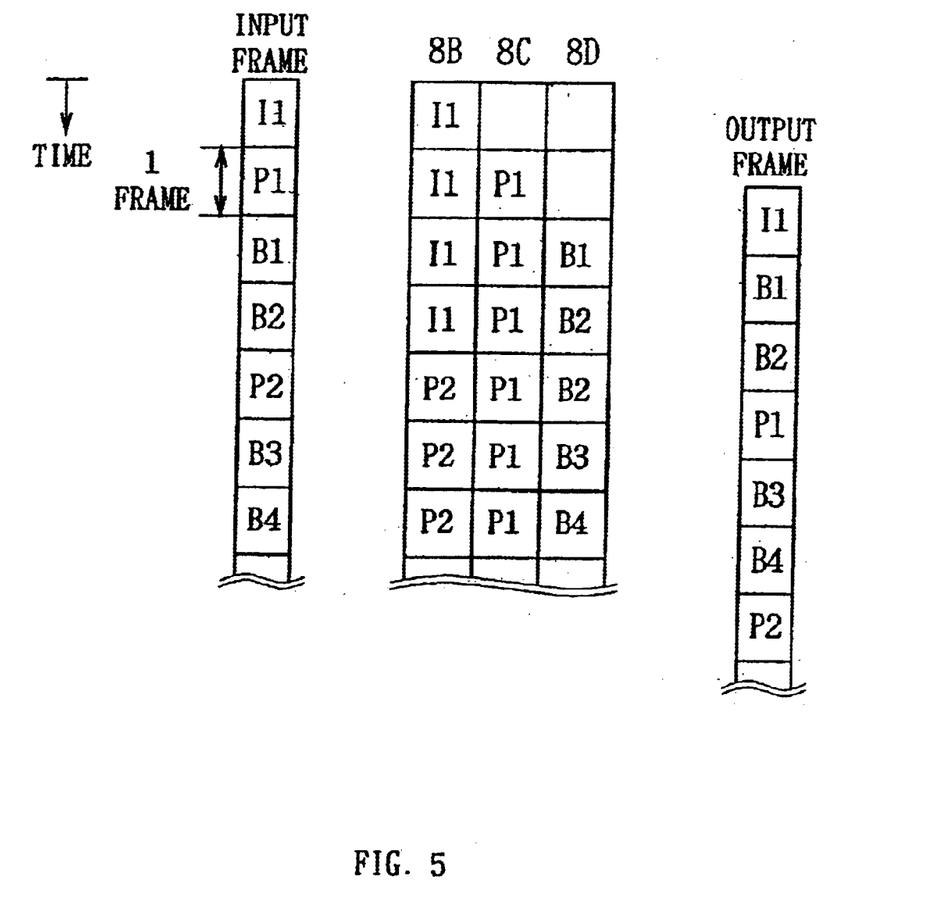
FIG. 5 is a diagram showing an example of the timing relationship among the input video data to the video decoder, video data to be stored in the memory and output video data in the normal reproduction.

FIG. 5 shows an example of the timing relationship among input video data to the video decoder 6, video data-stored in the memory 8 and output video data therefrom, in normal reproduction. In FIG. 5, input frames show the frames of the video data to be inputted to the video decoder 6, and output frames show the frames of the video data to be outputted from the video decoder 6. And 8B, 8C and 8D show the frames of the video data stored in the first output buffer area 8B, the second output buffer area 8C and the third output buffer area 8D, respectively.

As shown in FIG. 5, a first I-picture (I1) is first inputted, decoded and stored in the first output buffer area 8B. Secondly, a first P-picture (P1) is inputted, decoded and stored in the second output buffer area 8C. For this decoding of P1, I1 stored in the first output buffer area 8B is used. Thirdly, a first B-picture (B1) is inputted, decoded and stored in the third output buffer area 8D. For this recording of B1, I1 stored in the first output buffer area 8B and P1 stored in the second output buffer area 8C are used. Fourthly, a second B-picture (B2) is inputted, decoded and stored in the third output buffer area 8D is stored. Input frames are decoded and stored hereafter in the similar. The data thus stored in the first to the third output buffer areas are outputted in the sequence of I1, B1, B2, P1, B3, B4, P2, . . .

Figure 6:
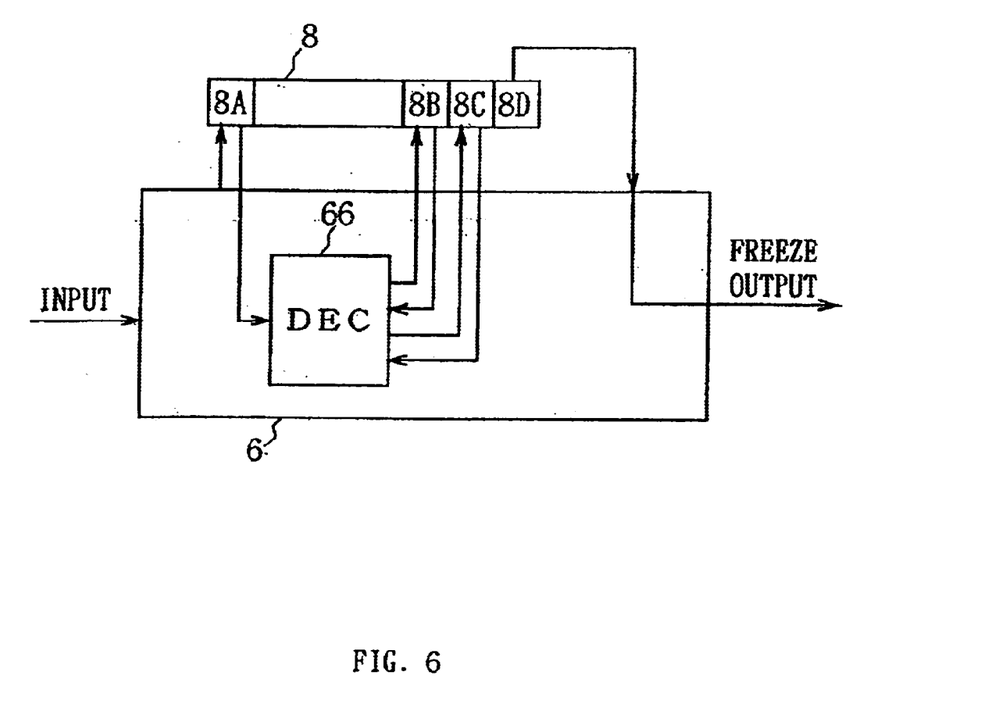
FIG. 6 is a diagram showing the flow of input/output video data in the video decoder when video data is frozen.

FIG. 6 shows the flow of input/output video data in the video decoder 6 when video data is frozen. Video data supplied from the demultiplexer 3 is stored in the input buffer area 8A in the memory 8. The stored data is read out at the prescribed timing and decoded by the decoding part 66. Then, I-pictures of that are stored in the first output buffer area 8B, and P-pictures of that are stored in the first output buffer area 8B or the second output buffer area 8C. On the other hand, since B-pictures of that are not stored in the input buffer area 8A or not decoded even if stored, they are-not stored in the third output buffer area 8D. Since the video data stored in the first output buffer area 8B and the second output buffer area 8C are not outputted to the outside of the video decoder 6, they are not displayed on a monitor or the like. The video data decoded before frozen and stored in the third output buffer area 8D are repeatedly outputted. At this time, since decoding and output of audio data are continued, audio is reproduced similar to the time of normal reproduction even if video is frozen. If the freeze is released, decoding of the video data is immediately started. Since the decoded I- and P-pictures are stored in the first output buffer area 8B and the second output buffer area 8C even under freezing, the video data can be outputted immediately after the freeze is released.

Figure 7:
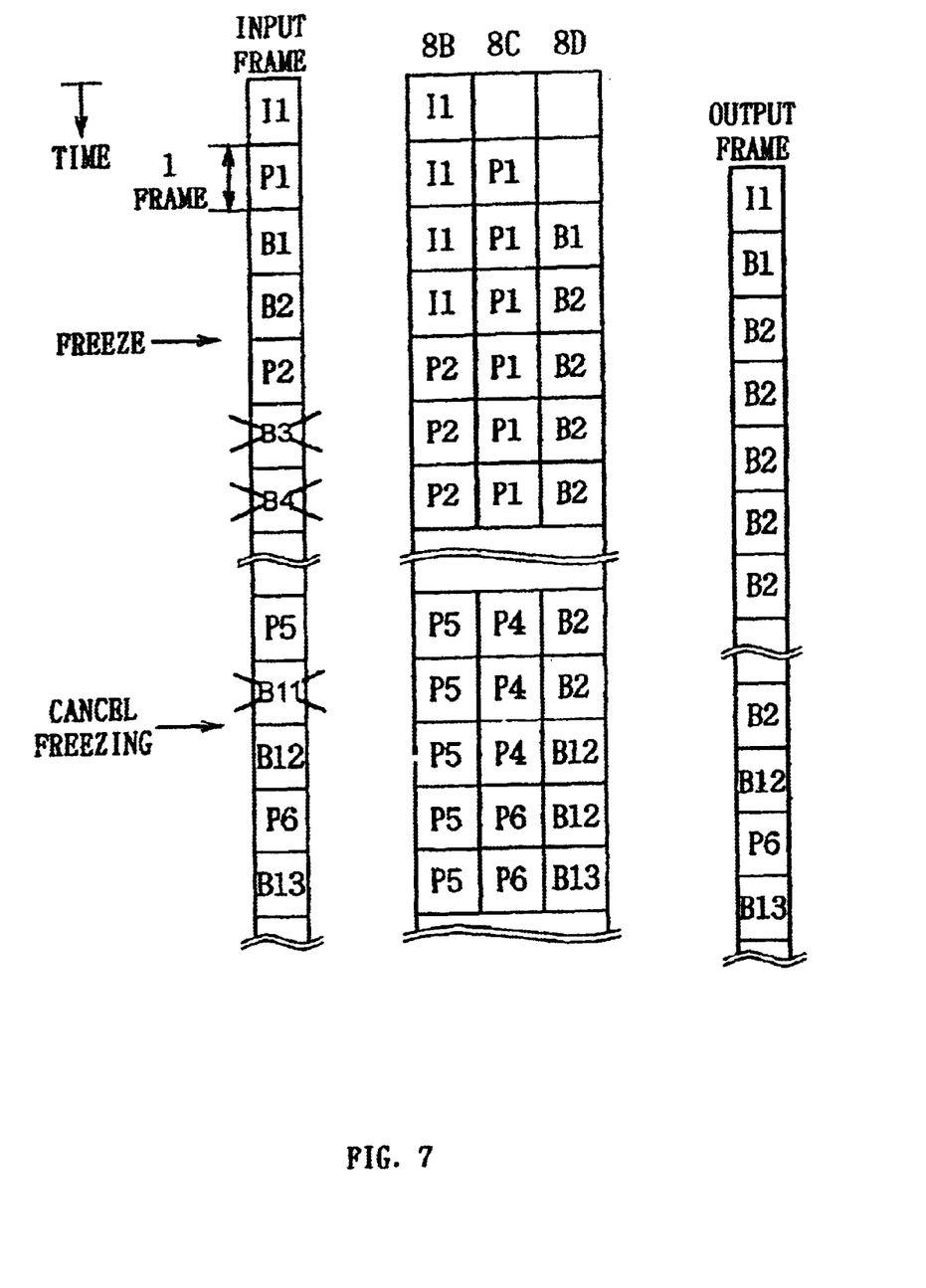
FIG. 7 is a diagram showing an example of the timing relationship among the input video data to the video decoder, video data to be stored in the memory and output video data from the video decoder when video data is frozen.

FIG. 7 shows an example of the timing relationship among input video data to the video decoder 6, video data to be stored in the memory 8 and output video data from the video decoder 6, when video data is frozen. The operation until a freeze command is given from a user and the operation after a release from freeze in FIG. 7 are similar to the operation in normal reproduction shown in FIG. 5. On the contrary, at the time of freeze, the video data stored in the third output buffer area 8D (it is B2 in this embodiment) is repeatedly outputted. Furthermore, the I- and the P-pictures to be inputted are sequentially decoded and alternately stored in the first output buffer area 8B and the second output buffer area 8C. If the freeze is released when B12 is inputted, B12 is decoded using P4 and P5 stored in the first output buffer area 8B and the second output buffer area BC, and the decoded B12 is stored in the third output buffer area 8D.

Note that, in this embodiment, the third output buffer area 8D is frozen but the first output buffer 8B or the second output buffer area 8C may be frozen.

That is, if a freeze command is given and the first output buffer 8B is frozen when B1 is inputted, the I-picture is frozen and the I- and P-pictures are decoded using the second output buffer 8C and the third output buffer 8D. On the other hand, if a freeze command is given and the second output buffer 8C is frozen when B1 is inputted, the P-picture is frozen and the I- and the P-pictures are decoded using the first output buffer 8B and the third output buffer 8D.

Figure 8:
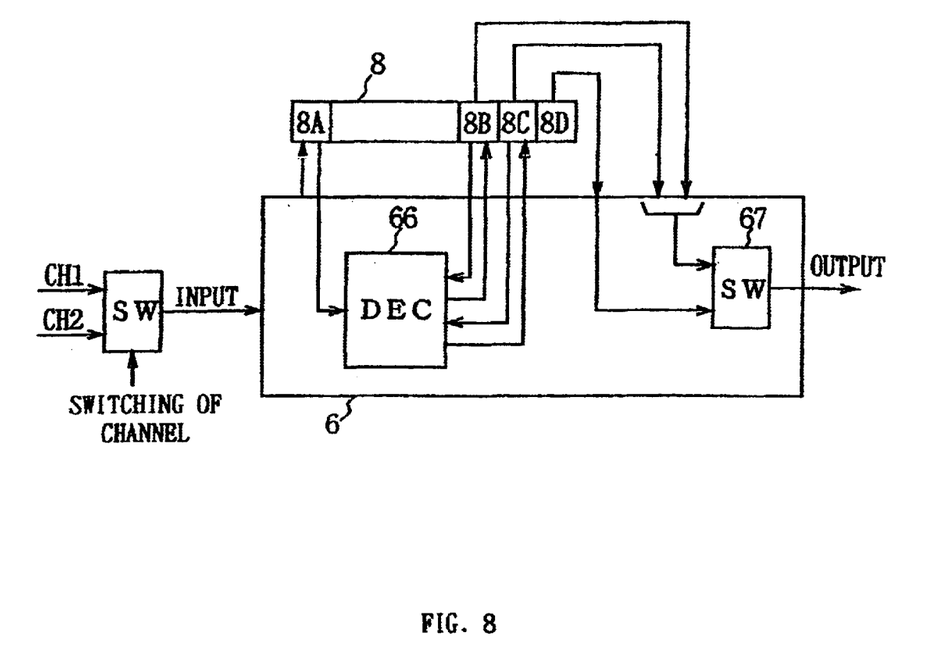
FIG. 8 is a diagram showing the flow of input/output video data in the video decoder when the channel of video data is switched.

FIG. 8 shows the flow of input/output video data in the video decoder 6 when the channel of video data is switched. The video data to be inputted here to the video decoder 6 is switched by a user's command. This switching is conducted by the demultiplexer 3, for example. Video data supplied from the demultiplexer 3 is stored in the input buffer area 8A in the memory 8. It is read out at the prescribed timing and decoded by the decoding part 66. I-pictures are stored in the first output buffer area 8B, and P-pictures are stored in the first output buffer area 8B or the second output buffer area 8C. Since B-pictures are not stored in the input buffer area 8A or not decoded even if stored, they are not stored in the third output buffer area 8D. Then, the video data decoded before channel switching and stored in the third output buffer area 8D are repeatedly outputted. By switching a switch 67, whether to output the video data stored in the third output buffer area 8D from the video decoder 6 before channel switching or to output the video data stored in the first output buffer area 8B and the second output buffer area 8C from the video decoder 6 after channel switching can be selected.

Figure 9:
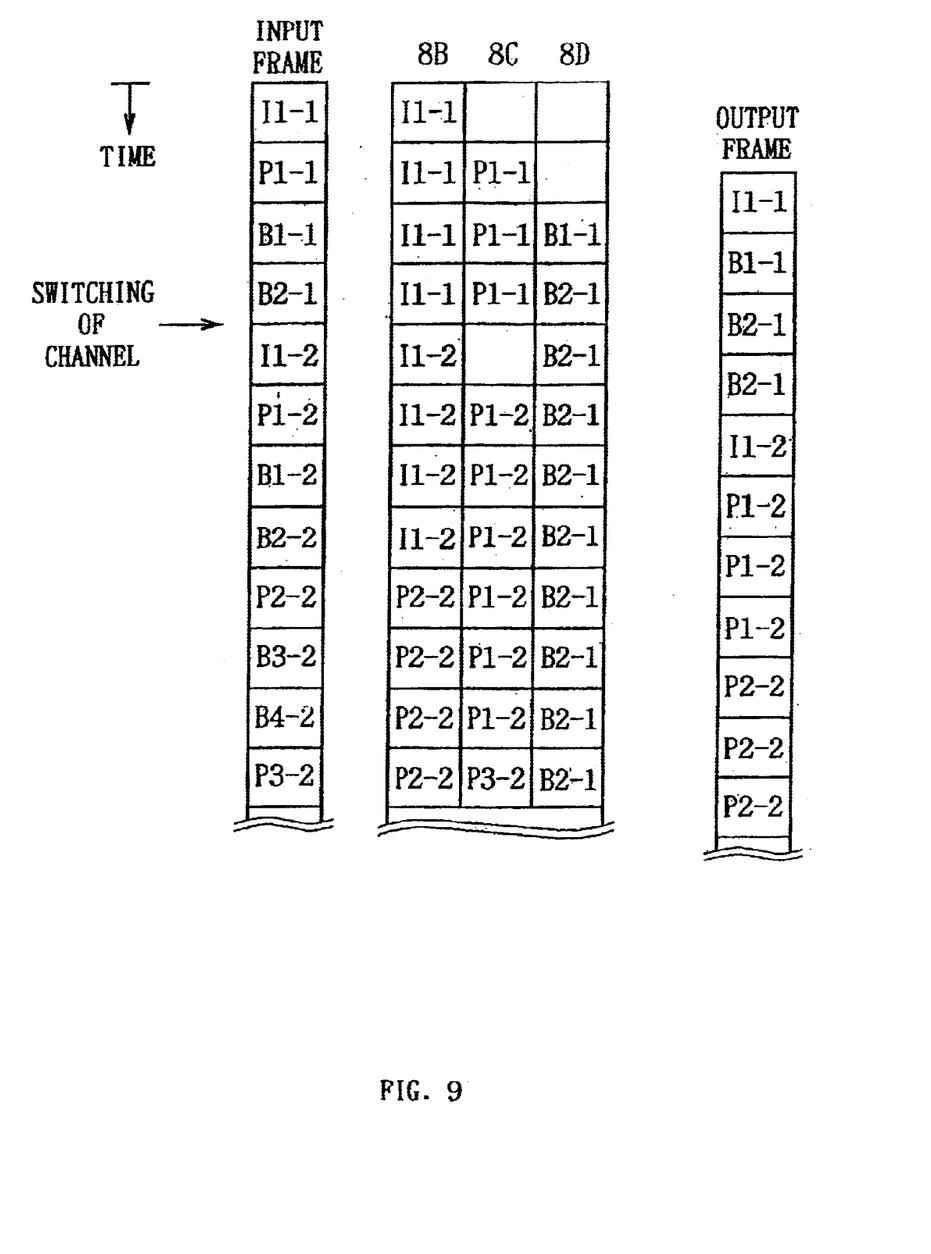
FIG. 9 is a diagram showing an example of the timing relationship among the input video data to the video decoder, video data to be stored in the memory and output video data from the video decoder when the channel of the video data is switched.

FIG. 9 shows an example of the timing relationship among input video data to the video decoder 6, video data to be stored in the memory 8 and output video data from the video decoder 6 when the channel of video data is switched. In this embodiment, it is assumed that the channel is switched from 1 to 2. In FIG. 9, numerical numbers added to "-" after picture numbers show channel numbers.

The operation before channel switching in FIG. 9 is similar to the operation in normal reproduction shown in FIG. 5. On the other hand, after the channel is switched from 1 to 2, the I- and the P-pictures of the channel 2 are sequentially decoded and alternately stored in the first output buffer area 8B and the second output buffer area 8C. The stored data are outputted from the video decoder 6 through the switch 67.

Figure 10:
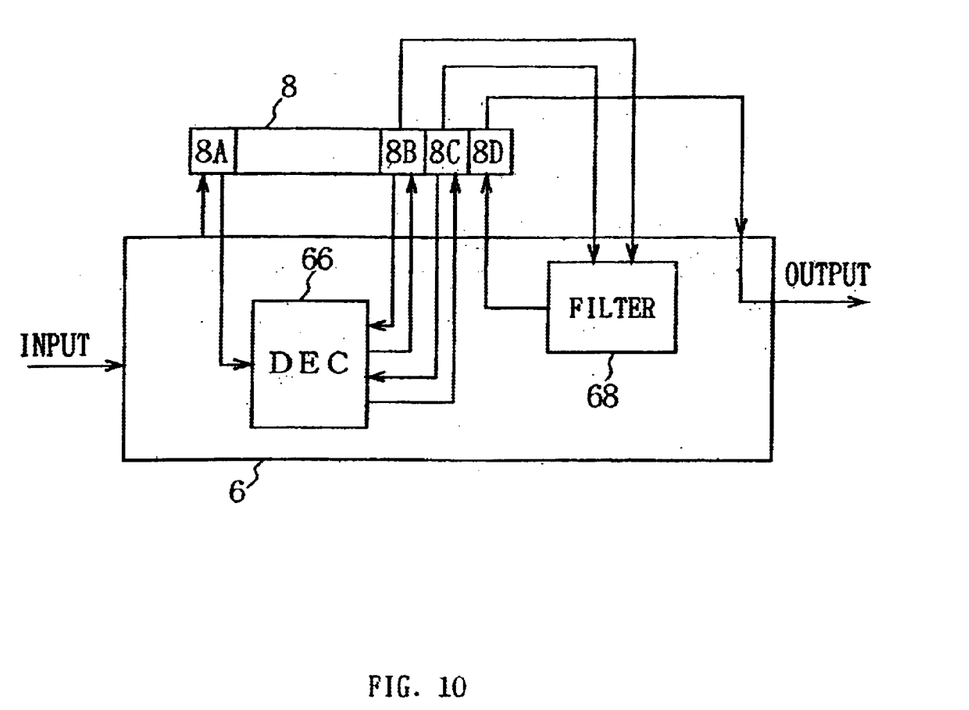
FIG. 10 is a diagram showing the flow of input/output video data in the video decoder at the times of strobe reproduction and [strobe reproduction+framing reproduction].

FIG. 10 shows the flow of input/output video data in the video decoder 6 in strobe reproduction and [strobe reproduction+framing reproduction]. Referring to FIG. 10, video data supplied from the demultiplexer 3 is stored in the input buffer area 8A in the memory 8. It is read out at the specified timing and decoded by the decoding part 66. Thus decoded I-pictures are stored in the first output buffer area 8B, and the P-pictures are stored in the first output buffer area 8B or the second output buffer area 8C. Since the B-pictures are not stored in the input buffer area 8A or not decoded even if stored, they are not stored in the third output buffer area 8D. The video data stored in the first output buffer area 8B and the video data stored in the second output buffer area 8C are read out at the prescribed timing, subjected to size reduction processing by a filter 68, and then, it is written in the third output buffer area 8D. The stored data is read out at the prescribed timing and outputted from the video decoder 6.

Figure 11:
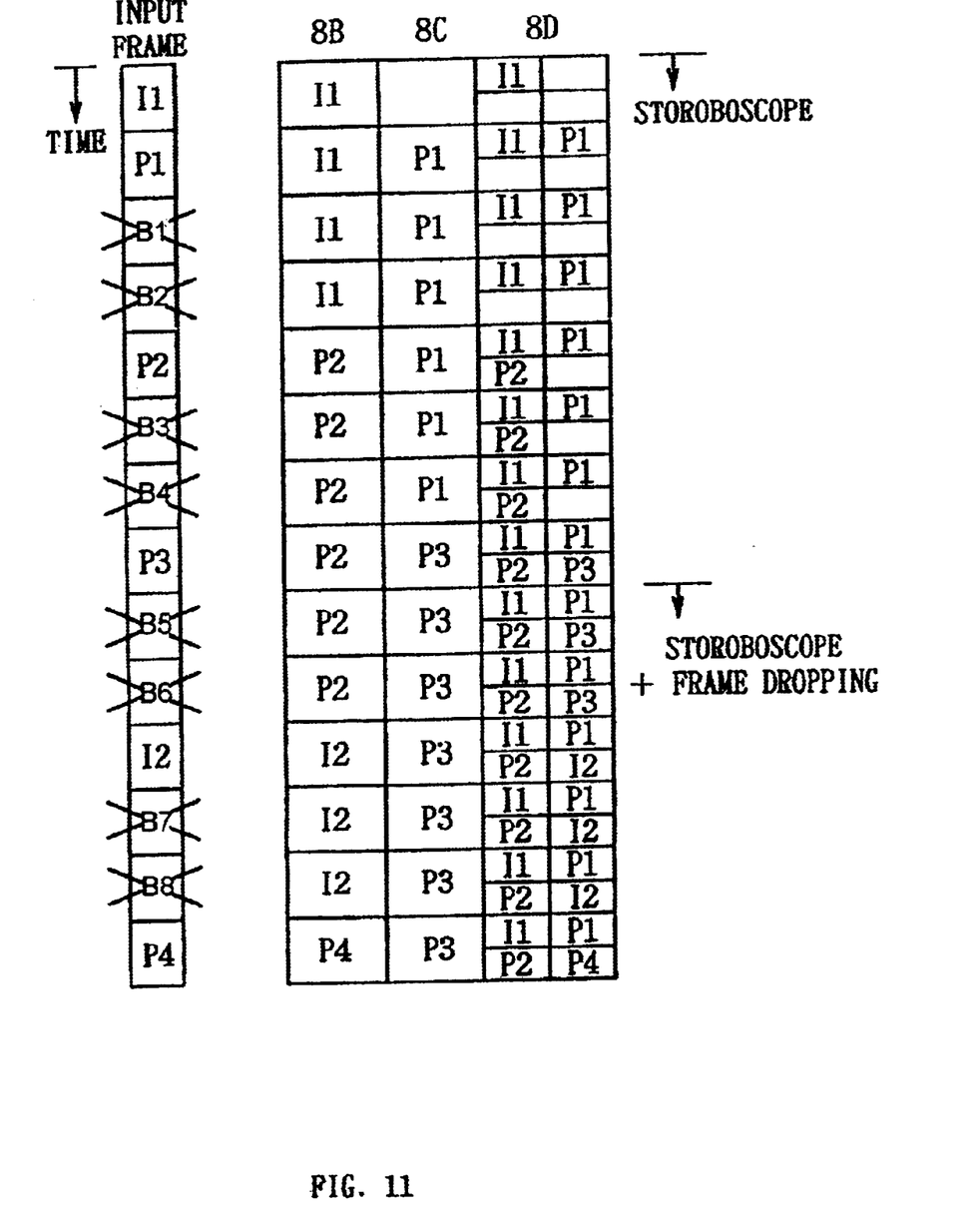
FIG. 11 is a diagram showing an example of the timing relationship between the input video data and video data to be stored in the memory at the times of the strobe reproduction and [strobe reproduction+framing reproduction].

FIG. 11 is a diagram showing an example of the timing relationship between input video data to the video decoder 6 and video data to be stored in the memory 8 in strobe reproduction and [strobe reproduction+framing reproduction].

As shown in FIG. 11, the first I-picture (I1) is first inputted, decoded and stored in the first output buffer area 8B. It is read out from here and reduced to a quarter size by the filter 68, and stored in the upper left part of the third output buffer area 8D. Then, it is read out from here at the prescribed timing and outputted from the video decoder 6.

Secondly, the first P-picture (P1) is inputted, decoded and stored in the second output buffer area 8C. It is reduced to a quarter size by the filter 68 and stored in the upper right part of the third output buffer area 8D. The video data stored in the upper left part of the third output buffer area 8D and the video data stored in the upper right part are read out from here at the prescribed timing and outputted from the video decoder 6.

Since the B-picture (B1) subsequently inputted and the second B-picture (B2) further subsequently inputted are not decoded, the contents of the memory 8 does not change. Then, the second P-picture (P2) subsequently inputted is decoded and stored in the first output buffer area 8B. It is read out from here and reduced to a quarter size by the filter 68, and stored in the lower left part of the third output buffer area 8D. Similarly, B3 and B4 are not decoded but P3 is decoded, and they are stored in the lower right part of the third output buffer area 8D.

Since the video data stored in the third output buffer area 8D is read out in a frame cycle, a strobe picture which corresponds to the change of pictures stored in the third output buffer area is displayed on a monitor screen connected to the output of the video decoder 6.

Then, it is assumed that an input frame is changed in [strobe reproduction+framing reproduction] from the timing of B5. Since B5 and B6 are not decoded, the contents of the memory 8 does not change. Then, I2 inputted subsequently to B6 is decoded and reduced to a quarter size by the filter 68, and then, it is stored in the lower right of the third output buffer area. Two frames subsequently inputted (B7 and B8) are not decoded. P4 inputted subsequently to B8 is decoded and reduced to a quarter size by the filter 68, and then, it is stored to the lower right of the third output buffer area.

Since the video data stored in the third output buffer area 8D is read out in a frame cycle, a [strobe-reproduced+framing reproduced] pictures are displayed on the monitor screen connected to the output of the video decoder 6, corresponding to the change of pictures stored in the third output buffer area. As a result, the picture at the lower right of the screen is updated by the I- and the P-pictures, and the other three fourth parts of the screen becomes a fixed picture.

Note that, in this embodiment, the screen is divided into four, however, the number of division is not limited to this. Also the position of framed picture is not limited at the lower right of the screen. In addition, if the channel of input frame is switched in the state of FIG. 11, pictures of plural different channels can be displayed on single screen.

INDUSTRIAL CAPABILITY

The present invention can be applied to a digital satellite broadcasting transmitter/receiver which receives a broadcasting program encoded using an MPEG system and reproduces it accompanying with special effects such as still picture, strobe reproduction, channel scanning, etc.

What is claimed is:

1. An information signal decoding method for decoding a data stream of encoded motion pictures, said method comprising the steps of:
   storing decoded motion picture data in plural areas of a memory means; and
   performing a freezing operation in which (i) motion picture data of a respective data stream is frozen and respective picture data representative of a single picture is continuously outputted using one of said plural areas, and (ii) intraframe predicted pictures and forward predicted pictures in the respective data stream continue to be sequentially decoded and stored using the other areas, and wherein at the conclusion of said freezing operation, said motion picture data is decoded using said decoded intraframe predicted and forward predictive pictures stored in said other areas, and said decoded motion picture data is stored in said memory.

2. The information signal decoding method according to claim 1, wherein freeze of motion picture data and continuous output of it are performed using one of said plural areas; intraframe predicted pictures and forward predicted pictures in a data stream of motion pictures to be inputted in said freeze are decoded using the other areas; and channel switching is performed by switching said motion picture data being frozen and said motion picture data of a different channel decoded using said other area for output.

3. The information signal decoding method according to claim 2, wherein;
   in said channel switching, either of said motion picture data being frozen or said motion picture data of the different channel is selected and outputted.

4. An information signal decoding method for decoding a data stream of encoded motion pictures and a data stream of encoded audio, said method comprising the steps of:
   storing decoded motion picture data in plural areas of a memory means; and
   performing a freezing operation in which (i) motion picture data of a respective data stream is frozen and respective picture data representative of a single picture is continuously outputted using one of said plural areas, (ii) intraframe predicted pictures and forward predicted pictures in the respective data stream continue to be sequentially decoded and stored using the other areas, and (iii) a corresponding data stream of audio is decoded while keeping a synchronous relationship with said motion pictures, and wherein at the conclusion of said freezing operation, said motion picture data is decoded using said decoded intraframe predicted and forward predictive pictures stored in said other areas, and said decoded motion picture data is stored in said memory.

5. The information signal decoding method according to claim 4, wherein:
   freeze of motion picture data and continuous output of it are performed using one of said plural areas;
   intraframe predicted pictures and forward predicted pictures in a data stream of motion pictures to be inputted in said freeze are decoded using the other areas; and
   channel switching is performed by switching said motion picture data being frozen and said motion picture data of a different channel decoded using said other area for output.

6. The information signal decoding method according to claim 5, wherein:
   in said channel switching, either of said motion picture data being frozen or said motion picture data of the different channel is selected and outputted.

7. An information signal decoding device for decoding a data stream of encoded motion pictures, comprising:
   a decoding means for decoding said data stream of motion pictures; and
   a motion picture data storing means having plural areas to store decoded motion picture data;
   wherein, during a freeze operation, (i) motion picture data of a respective data stream is frozen and respective picture data representative of a single picture is continuously outputted using one of said plural areas, and (ii) intraframe predicted pictures and forward predicted pictures in the respective data stream continue to be sequentially decoded and stored using the other areas, and wherein at the conclusion of said freezing operation, said motion picture data is decoded using said decoded intraframe predicted and forward predictive pictures stored in said other areas, and said decoded motion picture data is stored in said memory.

8. The information signal decoding device according to claim 7, further comprising a switch means for switching a channel by switching said plural areas for output.

9. The information signal decoding device according to claim 8, further comprising a selecting means for selecting an area to be switched by said switch means among said plural areas.

10. An information decoding device for decoding a data stream of encoded motion pictures and a data stream of encoded audio, comprising:

a first decoding means for decoding said data stream of motion pictures;

a second decoding means for decoding said data stream of audio;

a motion picture data storing means having plural areas to store decoded motion picture data; and a control means for synchronizing the decoding of motion picture data with the decoding of audio data wherein, during a freeze operation, (i) motion picture data of a respective data stream is frozen and respective picture data representative of a single picture is continuously outputted using one of said plural areas, (ii) intraframe predicted pictures and forward predictive pictures in the respective data stream continue to be sequentially decoded and stored using the other areas, and (iii) a corresponding data stream of audio is decoded while keeping a synchronous relationship with said motion pictures, and wherein at the conclusion of said freezing operation, said motion picture data is decoded using said decoded intraframe predicted and forward predictive pictures stored in said other areas, and said decoded motion picture data is stored in said memory.

11. The information signal decoding device according to claim 10, comprising:

a switch means for switching a channel by switching said plural areas for output.

12. The information signal decoding device according to claim 11, comprising:

a selecting means for selecting an area to be switched by said switch means among said plural areas.

13. An information signal decoding method for decoding a data stream of encoded motion pictures, said method comprising the steps of:

storing decoded motion picture data in plural areas of a memory means; and decoding, at the time of write-in or readout in one of said plural areas, intraframe predicted pictures and forward predicted pictures in a data stream of motion pictures using the other areas, and outputting the decoded motion picture data to said single area as a reduced picture adaptable for display on a screen divided into a plurality of display areas, wherein a reduced picture in a first display area is updated by intraframe predicted pictures and forward predicted pictures while reduced pictures in other display areas remain fixed, and wherein a first intraframe picture is inputted, decoded and stored in a first area, and then is read out and outputted for display.

14. The information signal decoding method according to claim 13, wherein;

motion picture data of the same channel are written in said single area while shifting an address so that the motion pictures are periodically sampled and displayed in reduced size.

15. The information signal decoding method according to claim 13, wherein;

motion picture data of channels periodically different are written in said single area while shifting an address so that the motion pictures of the channels periodically different are sampled and displayed in reduced size.

16. An information signal decoding device for decoding a data stream of encoded motion pictures, comprising:

a decoding means for decoding said data stream of motion pictures;

a motion picture data storing means having plural areas to store the decoded motion picture data; and a picture reducing means for generating reduced picture data from the decoded motion picture data wherein, at the time of write-in or readout in one of said plural areas, intraframe predicted pictures and forward predicted pictures in a data stream of motion pictures are decoded using the other areas, and the decoded motion picture data is outputted to said single area as a reduced picture adaptable for display on a screen divided into a plurality of display areas, wherein a respective reduced picture in a first display area is updated by intraframe predicted pictures and forward predicted pictures while reduced pictures in other display areas remain fixed, and wherein a first intraframe picture is inputted, decoded and stored in a first area, and then is read out and outputted for display.

* * * * *